(12) United States Patent
Nishiyama

(10) Patent No.: US 8,775,878 B2
(45) Date of Patent: Jul. 8, 2014

(54) INFORMATION PROCESSING APPARATUS, COMMUNICATION SYSTEM, COMMUNICATION CONTROL METHOD, AND STORAGE MEDIUM

(75) Inventor: Masashi Nishiyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 410 days.

(21) Appl. No.: 13/198,079

(22) Filed: Aug. 4, 2011

(65) Prior Publication Data

US 2012/0036403 A1 Feb. 9, 2012

(30) Foreign Application Priority Data

Aug. 4, 2010 (JP) ................................ 2010-175573

(51) Int. Cl.
*G06F 11/00* (2006.01)
(52) U.S. Cl.
USPC .............................................. 714/57; 714/48
(58) Field of Classification Search
USPC ....................................................... 714/48, 57
See application file for complete search history.

(56) References Cited

U.S. PATENT DOCUMENTS

| | | | |
|---|---|---|---|
| 6,697,970 B1 * | 2/2004 | Chisholm ...................... | 714/48 |
| 6,834,257 B2 * | 12/2004 | Keller ............................ | 702/183 |
| 7,284,163 B2 * | 10/2007 | Bhattacharjee et al. ........ | 714/48 |
| 7,389,448 B2 * | 6/2008 | Sakai .............................. | 714/48 |
| 2009/0327808 A1 * | 12/2009 | Takizawa ........................ | 714/24 |
| 2010/0058123 A1 * | 3/2010 | Yamashirodani et al. ...... | 714/57 |
| 2010/0083032 A1 * | 4/2010 | Alcorn et al. ..................... | 714/4 |
| 2012/0179940 A1 * | 7/2012 | Gawor et al. ................... | 714/57 |
| 2013/0159794 A1 * | 6/2013 | Bennah et al. .................. | 714/57 |

FOREIGN PATENT DOCUMENTS

JP 2007-065757 A 3/2007

* cited by examiner

*Primary Examiner* — Joshua Lohn
(74) *Attorney, Agent, or Firm* — Rossi, Kimms & McDowell LLP

(57) ABSTRACT

An information processing apparatus which make it possible to confirm an error recovery event. A device proxy server as an information processing apparatus is connected to a printer and a client PC via a network. The device proxy server receives an event message indicative of an event having occurred in a printer. The received event message is transferred to a client PC. When the event message transferred to the client PC is related to an error event indicative of an error having occurred in the printer, the device proxy server monitors whether or not the error event has been eliminated in the printer. When the error event is eliminated in the printer, the device proxy server sends an error recovery message indicative of elimination of the error event to the client PC.

8 Claims, 15 Drawing Sheets

FIG.4

| ID | UUID | VERSION | DEVICE TYPE | MODEL NAME | DEVICE NAME | URL | IP ADDRESS | XML STORAGE PATH |
|---|---|---|---|---|---|---|---|---|
| 1 | 123456 | 1 | Printer | LBPXXXX | Dev Printer | http://192.168.0.1/wsd/mex | 192.168.0.1 | C:¥temp/123·· |
| 2 | 987654 | 1 | Printer | LBPYYYY | Sales Printer | http://192.168.0.2/wsd/mex | 192.168.0.2 | C:¥temp/987·· |
| 3 | abcdef | 1 | MFP | MFPXXXX | Dev MFP | http://192.168.0.3/wsd/mex | 192.168.0.3 | C:¥temp/abc·· |

401 402 403 404 405 406 407 408 409

400

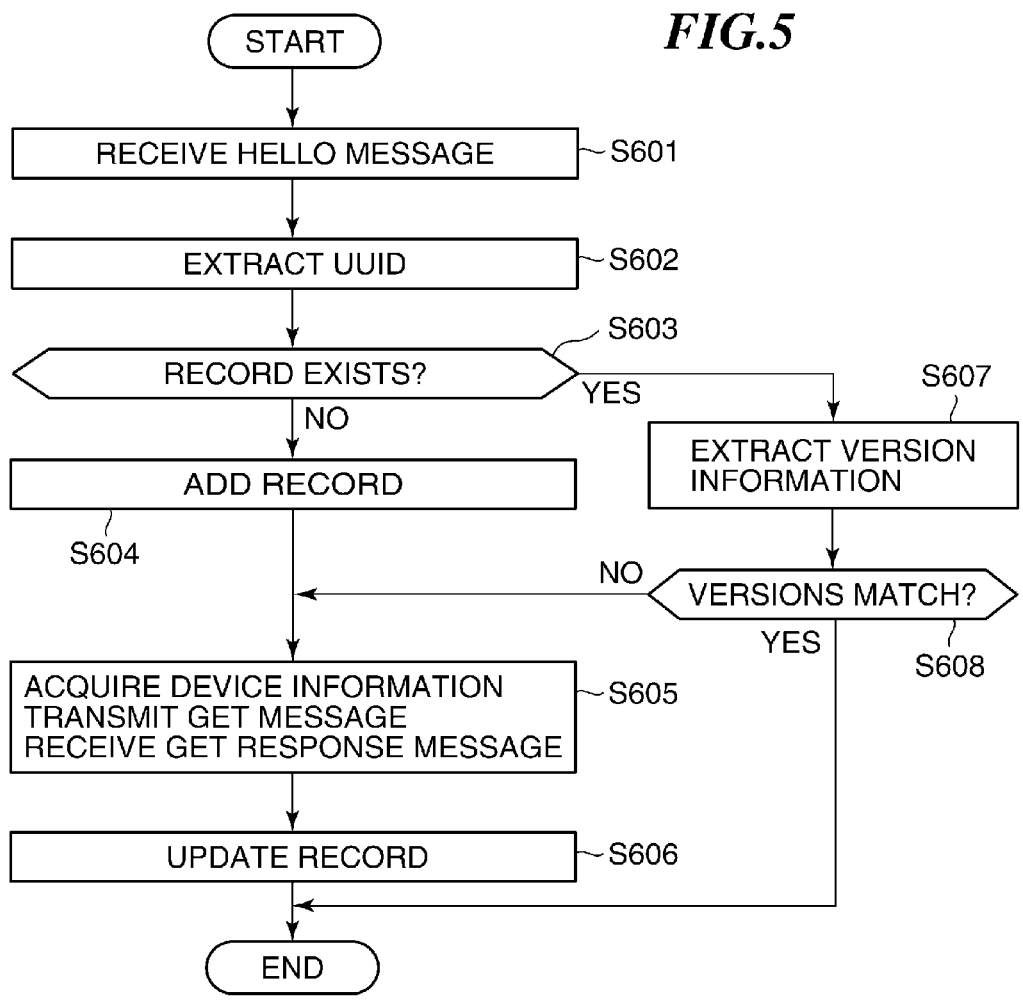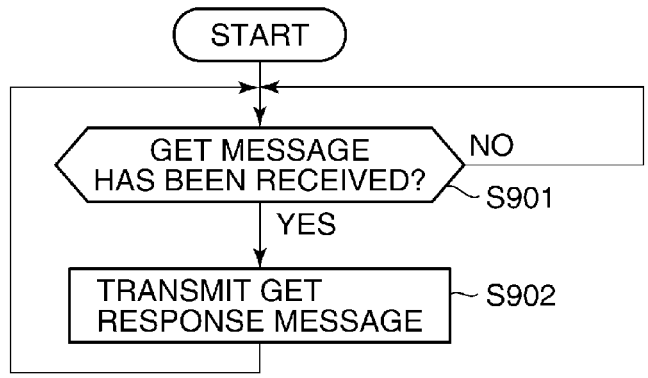

FIG.14

| ID | EVENT REGISTRATION DESTINATION URL | EVENT NOTIFICATION DESTINATION URL | EVENT TYPE | YET-TO-BE-TRANSMITTED ERROR RECOVERY EVENT LIST |
|---|---|---|---|---|
| 1 | http://192.168.0.1/wsd/print | http://192.16.2.111/wsd/clientcomputer | PrinterStatusEvent | MessageID:4444(ServiceCall) |
| 2 | | http://192.16.2.112/wsd/clientcomputer | PrinterStatusEvent | MessageID:4444(ServiceCall) |
| 3 | | http://192.16.2.113/wsd/clientcomputer | PrinterStatusEvent | MessageID:4444(ServiceCall) |
| 4 | | http://192.16.2.114/wsd/clientcomputer | PrinterStatusEvent | MessageID:4444(ServiceCall) |
| 5 | | http://192.16.2.115/wsd/clientcomputer | PrinterStatusEvent | MessageID:4444(ServiceCall) |
| 6 | | http://192.16.2.116/wsd/clientcomputer | PrinterStatusEvent | MessageID:4444(ServiceCall) |
| 7 | http://192.168.0.2/wsd/print | http://192.16.2.111/wsd/clientcomputer | PrinterStatusEvent | MessageID:6666(Out Of Tonner)<br>MessageID:6667(ServiceCall) |
| 8 | | http://192.16.2.112/wsd/clientcomputer | PrinterStatusEvent | MessageID:6666(Out Of Tonner)<br>MessageID:6667(ServiceCall) |

FIG.15

| ID | EVENT NOTIFICATION DESTINATION URL | EVENT TYPE |
|---|---|---|
| 1 | http://192.168.2.121/wsd/deviceproxy | PrinterStatusEvent |
| 2 | http://192.168.0.111/wsd/clientcomputer | PrinterStatusEvent |
| 3 | http://192.169.0.112/wsd/clientcomputer | PrinterStatusEvent |
| 4 | http://192.169.0.113/wsd/clientcomputer | PrinterStatusEvent |

INFORMATION PROCESSING APPARATUS, COMMUNICATION SYSTEM, COMMUNICATION CONTROL METHOD, AND STORAGE MEDIUM

BACKGROUND OF THE INVENTION

1. Field of the Invention

The present invention relates to an information processing apparatus, a communication system, a communication control method, and a storage medium, and more particularly to a communication system including a server apparatus, a client apparatus, and a terminal apparatus interconnected via a network.

2. Description of the Related Art

In general, in a communication system using WS-Eventing (Web Services Eventing), a client PC (personal computer) as a client apparatus performs registration of a request for event notification (hereinafter referred to as "event registration") in an event notification apparatus (terminal apparatus).

When an event occurs, the event notification apparatus sends an event message to all client PCs that have performed event registration. This makes it possible for client PCs to grasp conditions of various event notification apparatuses existing on a network, in real time. By grasping the conditions of the event notification apparatuses in real time, it is possible to make effective use of an available event notification apparatus. Further, it is possible to perform prompt and smooth troubleshooting when a trouble occurs in any of the event notification apparatuses.

Assuming that an event notification apparatus is a printer, events that occur in the event notification apparatus are categorized into a job state changing event, and an error event, such as paper jam, a toner or ink shortage, and failure of the printer itself, for example. When an error event message is received from a printer, some client PCs determine that the printer having sent the event message is faulty, and inhibits the use of the printer from then on. For this reason, when having recovered from the error, the printer is required to send an error recovery event message to the client PCs.

If the error recovery event message is not transmitted, the client PCs determine, even after the recovery of the printer, that the printer is still faulty, and hence cannot cancel the inhibition of the use of the printer.

By the way, there has been proposed a printer configured to be capable of storing information on the history of transmission of error event messages so as to reliably send to the client PCs an error recovery event message indicative of recovery from an error after occurrence of the error (see e.g. Japanese Patent Laid-Open Publication No. 2007-65757).

In general, however, an inexpensive printer may not be provided with a nonvolatile storage medium, and even if an inexpensive printer is provided with a nonvolatile storage medium, the capacity of the nonvolatile storage medium is small, which makes it difficult for the printer to store information on the history of transmission of error event messages as disclosed in Japanese Patent Laid-Open Publication No. 2007-65757.

More specifically, in a printer with a small-capacity storage medium, there is a possibility that other information has been written in before, causing elimination of the information on the history of transmission of error event messages, including destinations of transmission of the error event messages. This makes it impossible to ensure reliable transmission of the error recovery event message to the client PCs.

Therefore, in a communication system to which such an inexpensive printer as mentioned above is connected, it is difficult for a client PC to confirm an error recovery event.

SUMMARY OF THE INVENTION

The present invention provides an information processing apparatus, a communication system, a communication control method, and a storage medium, which make it possible to confirm an error recovery event.

In a first aspect of the present invention, there is provided an information processing apparatus connectable to a terminal apparatus and a client apparatus via a network, comprising a reception unit configured to receive an event message indicative of an event having occurred in the terminal apparatus, a transfer unit configured to transfer the event message received by the reception unit to the client apparatus, a monitoring unit configured to be operable when the event message transferred to the client apparatus is related to an error event indicative of an error having occurred in the terminal apparatus, to monitor whether or not the error event has been eliminated in the terminal apparatus, and a notification unit configured to be operable when the error event is eliminated in the terminal apparatus, to send an error recovery message indicative of elimination of the error event to the client apparatus.

In a second aspect of the present invention, there is provided a communication system including a terminal apparatus, a client apparatus, and an information processing apparatus which are interconnectable via a network, wherein the information processing apparatus or the client apparatus is registered in the terminal apparatus as an event notification destination in association with an event, the terminal apparatus comprising an error determination unit configured to be operable when an event having occurred in the terminal apparatus is a registered event registered in advance as an event to be notified of, to determine whether or not the event is an error event, a notification destination-determining unit configured to be operable when the event is the error event, to determine whether or not the event notification destination is the information processing apparatus, and an event notification unit configured to be operable when the event notification destination is the information processing apparatus, to send an error event message indicative of the error event to the information processing apparatus, the information processing apparatus comprising a reception unit configured to receive an event message indicative of an event having occurred in the terminal apparatus, a transfer unit configured to transfer the event message received by the reception unit to the client apparatus, a monitoring unit configured to be operable when the event message transferred to the client apparatus is related to the error event indicative of the error having occurred in the terminal apparatus, to monitor whether or not the error event has been eliminated in the terminal apparatus, and a notification unit configured to be operable when the error event is eliminated in the terminal apparatus, to send an error recovery message indicative of elimination of the error event to the client apparatus.

In a third aspect of the present invention, there is provided a communication control method of controlling a communication system including a terminal apparatus, a client apparatus, and an information processing apparatus which are interconnectable via a network, wherein the communication control method causes the terminal apparatus to have the information processing apparatus or the client apparatus registered therein as an event notification destination in association with an event, to determine, when an event having occurred in the terminal apparatus is a registered event registered in advance as an event to be notified of, whether or not the event is an error event, to determine whether or not the event notification destination is the information processing apparatus when the event is the error event, and to send an error event message indicative of the error event to the information processing apparatus, when the event notification destination is the information processing apparatus, and causes the information processing apparatus to receive an event message indicative of an event having occurred in the terminal apparatus, to transfer the event message received by the reception unit to the client apparatus, to monitor whether or not the error event has been eliminated in the terminal apparatus when the event message transferred to the client apparatus is related to the error event indicative of the error having occurred in the terminal apparatus, and to send an error recovery message indicative of elimination of the error event to the client apparatus when the error event is eliminated in the terminal apparatus.

In a fourth aspect of the present invention, there is provided a non-transitory computer-readable storage medium storing a computer-executable program for causing a computer to execute a communication control method of controlling a communication system including a terminal apparatus, a client apparatus, and an information processing apparatus which are interconnectable via a network, wherein the communication control method causes the terminal apparatus to have the information processing apparatus or the client apparatus registered therein as an event notification destination in association with an event, to determine, when an event having occurred in the terminal apparatus is a registered event registered in advance as an event to be notified of, whether or not the event is an error event, to determine whether or not the event notification destination is the information processing apparatus when the event is the error event, and to send an error event message indicative of the error event to the information processing apparatus, when the event notification destination is the information processing apparatus, and causes the information processing apparatus to receive an event message indicative of an event having occurred in the terminal apparatus, to transfer the event message received by the reception unit to the client apparatus, to monitor whether or not the error event has been eliminated in the terminal apparatus when the event message transferred to the client apparatus is related to the error event indicative of the error having occurred in the terminal apparatus, and to send an error recovery message indicative of elimination of the error event to the client apparatus when the error event is eliminated in the terminal apparatus.

According to the present invention, the information processing apparatus monitors and checks an error occurrence state of the terminal apparatus, and sends the error recovery message to the client PC when the error is eliminated. This enables the client PC to be notified of recovery of the terminal apparatus from the error.

Further features of the present invention will become apparent from the following description of exemplary embodiments (with reference to the attached drawings).

BRIEF DESCRIPTION OF THE DRAWINGS

FIG. 4 is a diagram showing an example of device information stored in the device proxy server or a hard disk (HD) provided in a client PC.

FIG. 5 is a flowchart of a device information registration process executed by the device proxy server.

FIG. 6 is a flowchart of a get message reception and get response message transmission process executed by each printer.

FIG. 14 is a diagram showing an example of proxy event information stored in the hard disk in the device proxy server.

FIG. 15 is a diagram showing an example of event registration information stored in a RAM in a printer.

DESCRIPTION OF THE EMBODIMENTS

The present invention will now be described in detail below with reference to the accompanying drawings showing embodiments thereof.

Figure 1:
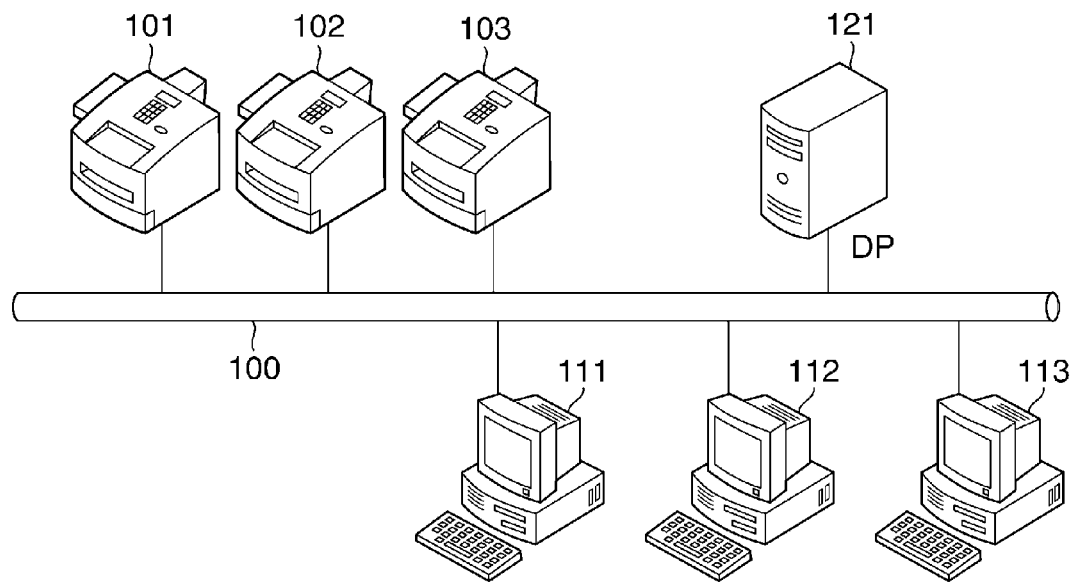
FIG. 1 is a schematic diagram of a communication system according to a first embodiment of the present invention.

FIG. 1 is a schematic diagram of a communication system according to a first embodiment of the present invention.

Referring to FIG. 1, the communication system includes a plurality of printers (terminal apparatuses) 101 to 103 as event notification apparatuses. The printers 101 to 103 are connected to a plurality of client PCs 111 to 113 as client apparatuses and a device proxy server (information processing apparatus) 121 via a network 100.

Each of the printers 101 to 103 appearing in FIG. 1 has not only a print function originally provided for a printer, but also an event transmission function for transmitting an event message to a PC having performed event registration (hereinafter referred to as "event registration source"), using WS-Eventing. In the illustrated example, events are categorized into a job state changing event, and an error event, such as paper jam, a toner or ink shortage, or failure of a printer itself. Further, each of the printers 101 to 103 has an error response function for transmitting a request response indicative of a job state change or an error state in response to a request.

In addition, each of the printers 101 to 103 appearing in FIG. 1 is provided with a nonvolatile storage medium. However, since the capacity of the nonvolatile storage medium is small, information on event registration sources is stored not in the nonvolatile storage medium, but e.g. in a volatile storage medium, such as a RAM. Therefore, when the power of a printer is turned on/off, the information on the event registration sources is all cleared from the printer. For this reason, after the power is turned on/off, even when an error is eliminated, the printers 101 to 103 cannot send an error recovery event message to the event registration sources.

Each of the client PCs 111 to 113 is a client apparatus (information processing apparatus) having a calculation function, a control function, and a display function, for example. Each of the client PCs 111 to 113 transmits a print job to at least the printers 101 to 103 (hereafter, it is assumed that "transmission" is performed by unicast, unless it is specifically stated otherwise). As a consequence, one of the printers 101 to 103 having received the print job performs printing corresponding to the print job.

Each of the client PCs 111 to 113 also has a search function for searching for the printers 101 to 103 and the device proxy server 121 using WS-Discovery (web service dynamic discovery). Further, each of the client PCs 111 to 113 has a message sending function for sending an event registration message to a desired one of the printers 101 to 103 or the device proxy server 121 using WS-Eventing. When an error event message is received from one of the printers 101 to 103, each of the client PCs 111 to 113 makes it impossible to transmit a print job to the one of the printer 101, 102, and 103 until an error recovery event message is received.

The device proxy server 121 has a search and response function for searching for the printers 101 to 103 according to a device search request from any of the client PCs 111 to 113 and sending a result of the search to the client PC 111, 112, or 113. In the illustrated example, when any of the client PCs 111 to 113 finds the device proxy server 121 by device proxy server search, the client PC requests the device proxy server 121 to perform printer search.

Then, the client PC also requests the device proxy server 121 to perform event registration in the printers 101, 102, and 103 found by the device proxy server 121. This causes the device proxy server 121 to perform event registration on behalf of the client PC 111, 112, or 113.

When an event occurs in any of the printers 101 to 103, the printer transmits an event message to the device proxy server 121. When the event having occurred in the printer is an error event, the printer 101, 102, or 103 sends an error event message to the device proxy server 121.

When the error event (i.e. the error event message) is received, the device proxy server 121 queries the printer 101, 102, or 103 as to the error state at predetermined time intervals. On the other hand, when a response to the effect that the error has been eliminated is received, the device proxy server 121 sends an error recovery event message to the client PCs 111 to 113.

Each of the client PCs 111 to 113 may directly perform event perform event registration in the printers 101 to 103. In this case, however, even if an error occurs in one of the printers 101 to 103, the printer does not send an error event message to the client PCs 111 to 113. Further, when the power of the printer is turned off and on to restart, information on the event registration source is cleared as mentioned hereinbefore, so that the printer cannot send an error recovery event message to the event registration source.

Figure 2:
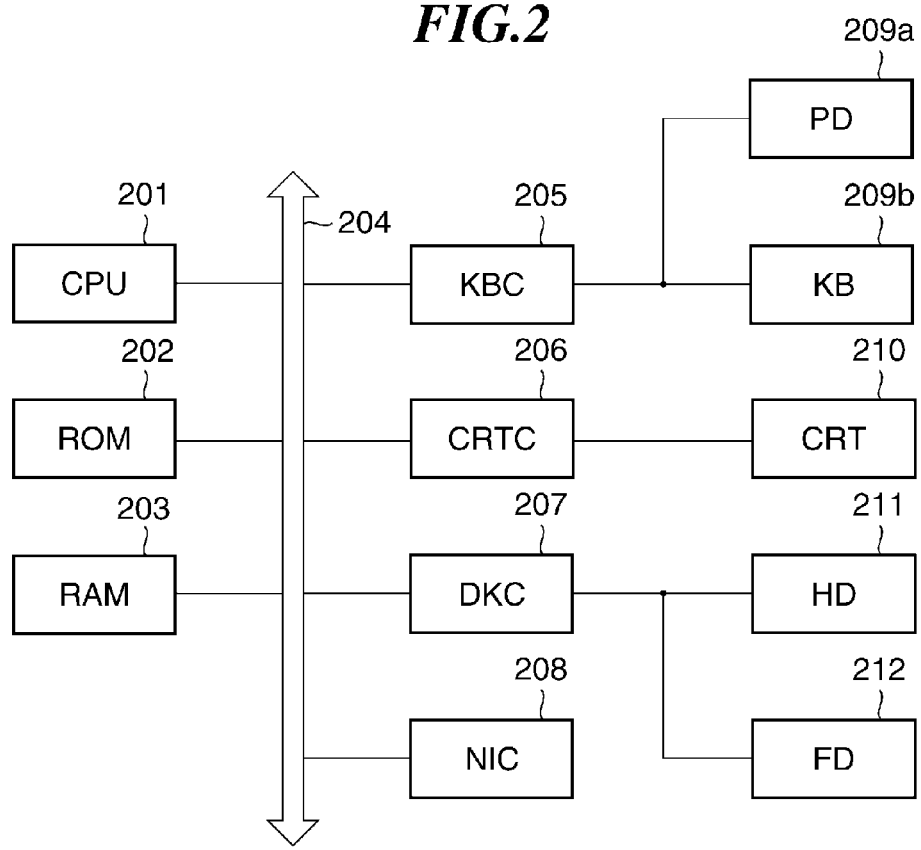
FIG. 2 is a block diagram showing the hardware configuration of a device proxy server (DP) or a client PC appearing in FIG. 1.

FIG. 2 is a block diagram showing the hardware configuration of the device proxy server 121 and each of the client PCs 111 to 113 appearing in FIG. 1. Each of the device proxy server 121 and the client PCs 111 to 113 can be implemented by a so-called general-purpose PC, and the device proxy server 121 and the client PCs 111 to 113 have the same hardware configuration as shown in FIG. 2. Therefore, the following description will be given of the device proxy server 121 by way of example.

Referring to FIG. 2, the device proxy server 121 has a CPU 201. The CPU 201 controls various devices connected to a system bus 204. A ROM 202 stores a BIOS, a boot program, and so forth, and a RAM 203 is used as a main storage device of the CPU 201.

A keyboard controller (KBC) 205 performs input processing e.g. for information input via a pointing device 209a, such as a mouse (registered trademark), and a keyboard 209b. A display controller (CRTC) 206 incorporates a video memory. The display controller 206 renders image data into a video memory according to an instruction from the CPU 201 and outputs the image data rendered in the video memory to a CRT display device 210, as a video signal.

Although the CRT display device 210 appears in FIG. 2, a liquid crystal display device or another display device may be used.

A disk controller (DKC) 207 provides access to a hard disk (HD) 211 and a floppy (registered trademark) disk 212. A network interface card (NIC) 208 is connected to the network 100 (see FIG. 1) to perform information communication via the network 100. Note that the hard disk 211 stores an OS (operating system), various application programs operating on the OS, and so forth.

With the above-described hardware configuration, when the power of the device proxy server 121 is turned on, the CPU 201 reads the OS from the hard disk 211 and stores the same in the RAM 203, according to the boot program stored in the ROM 202, to start functioning as an information processing apparatus.

Figure 3:
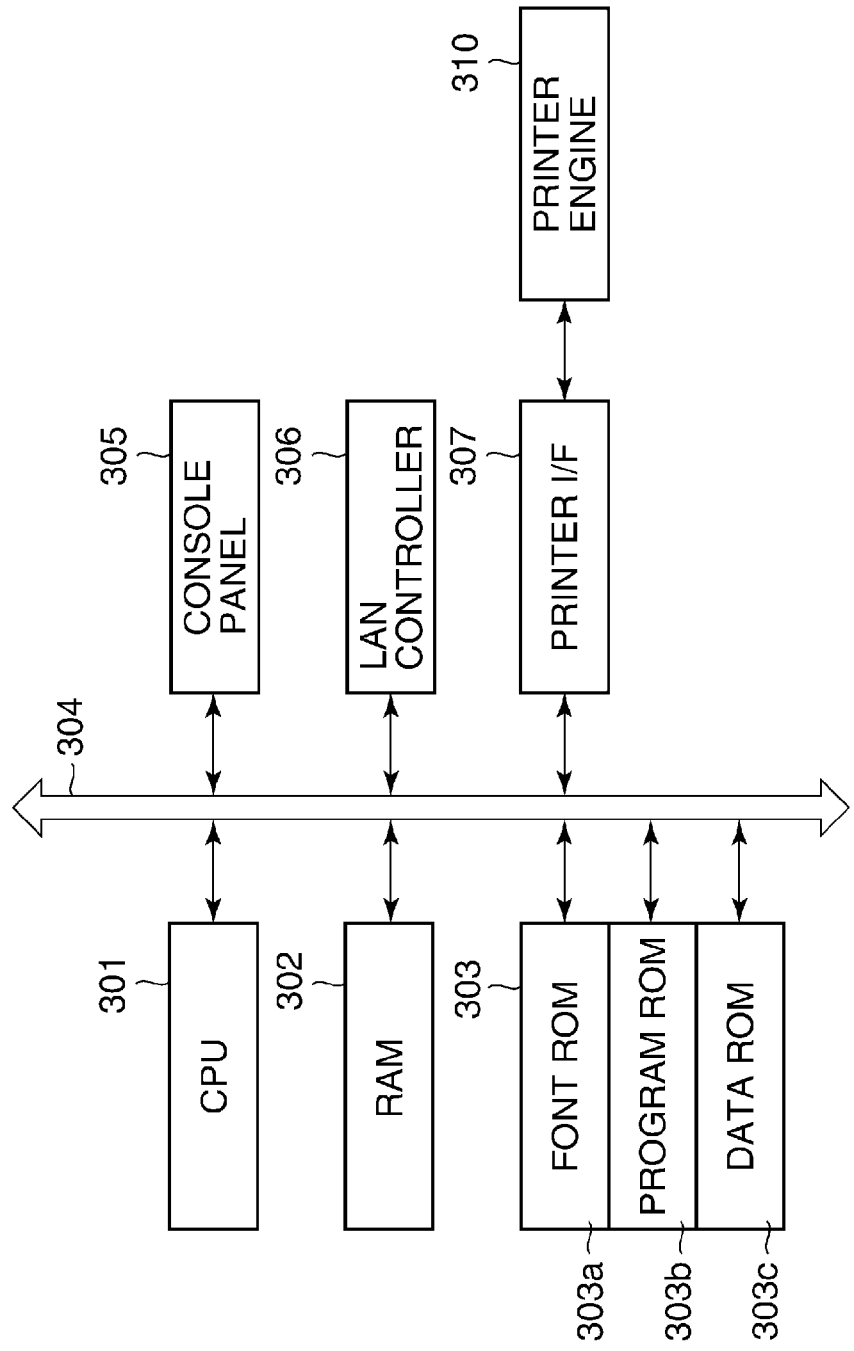
FIG. 3 is a block diagram showing the hardware configuration of each printer appearing in FIG. 1.

FIG. 3 is a block diagram showing the hardware configuration of each of the printers 101 to 103 appearing in FIG. 1. The printers 101 to 103 are identical in hardware configuration, and therefore the following description will be given of the printer 101 by way of example.

Referring to FIG. 3, the printer 101 has a CPU 301. In the illustrated example, a ROM 303 is divided into a font ROM 303a, a program ROM 303b, and a data ROM 303c.

The CPU 301 controls access to various devices connected to a system bus 304 in a centralized manner based on a control program stored in the program ROM 303b. Further, the CPU 301 outputs image data as output information to a printer section (printer engine) 310 connected to the system bus 304 via a printer interface 307. Furthermore, the CPU 301 receives an image signal input from a reader section (scanner: not shown) connected to the system bus 304 via a reader interface (not shown).

The font ROM 303a stores font data (including outline font data) and the like e.g. for use by the CPU 301 in generating image data (output information) from an image signal. The data ROM 303c stores information and the like for use by a host computer (e.g. a client PC).

The CPU 301 can communicate with the host computer and image forming apparatuses (other printers) on the network 100 via a LAN controller 306. A RAM 302 is basically used as a main memory, a work area, and so forth for the CPU 301.

Note that the RAM 302 is a volatile storage medium and is also used as an output information loading area, an environmental data storage area, etc. A user inputs various kinds of information using software keys provided on a console panel 305.

FIG. 4 is a diagram showing an example of device information stored in the hard disk 211 provided in the device proxy server 121 or each of the client PCs 111 to 113.

In the following, a description will be given of device information stored in the hard disk 211 in the device proxy server 121, by way of example. A device information management table 400 shown in FIG. 4 stores information on each device or apparatus (hereinafter referred to as device information) as a record. The device information management table 400 stores records each comprising an ID 401, a UUID (universally unique identifier) 402, a version 403, a device type 404, a model name 405, a device name 406, a URL 407, an IP address 408, and an XML storage path 409.

The ID 401 is an identifier for identifying a device so as to manage devices in the device proxy server 121. The UUID 402 is an identifier for globally and uniquely identifying a device. The version 403 represents the version of a device information record. The device type 404 includes "MFP" representative of a multifunction machine, "Printer" representative of a printer, and so forth.

The model name 405 is a name representative of a model of a device, such as "LBPXXXX". The device name 406 is a name assigned to a device by a device administrator. The URL 407 is used for acquisition of device information. The IP address 408 is an IP address of a device. The XML storage path 409 represents a storage destination in the hard disk 211 where get response data acquired from a device, referred to hereinafter, stored.

The CPU 301 of each of the printers 101 to 103 sends a hello message in XML format to the device proxy server 121 when the power of the printer is turned on, to thereby notify the device proxy server 121 of existence of the printer. The hello message comprises a header section 501 surrounded by a <Header> tag and a body section 502 surrounded by a <Body> tag, and the entire hello message is surrounded by an <Envelope> tag.

The header section 501 functions as a common header independent of the contents of a message, and an <Action> tag, a <Message ID> tag, and a <To> tag exist in the header section 501. The <Action> tag is provided to identify the type of a message. The <Message ID> tag is an identifier for uniquely identifying the message. The <To> tag is provided to identify a transmission destination of the message. On the other hand, the structure of the body section 502 changes according to the contents of a message.

In the hello message, a <Hello> tag exists immediately below the <Body> tag to indicate that the present message is the hello message. Within the <Hello> tag, there are an <Endpoint Reference> tag, a <Types> tag, an <XAddrs> tag, and a <Metadata Version> tag. Within the <Endpoint Reference> tag, there is an <Address> tag, and the <Address> tag contains address information for identifying a device.

The <Types> tag contains device type information. The <XAddrs> tag contains a URL for acquisition of device information. The <Metadata Version> tag contains the version of the device information.

FIG. 5 is a flowchart of a device information registration process executed by the device proxy server 121.

Referring to FIGS. 2 and 5, it is now assumed that the CPU 201 of the device proxy server 121 receives a hello message (step S601). The CPU 201 extracts the value of the <Address> tag in the <Endpoint Reference> tag from the hello message, as a UUID for globally identifying the device (step S602). Then, the CPU 201 checks whether or not the device information management table 400 has a record having a UUID identical in value to the <Address> tag (step S603).

If the device information management table 400 has no such a record (NO to the step S603), the CPU 201 extracts the value of the <Types> tag as a device type from the received hello message. Further, the CPU 201 extracts the value of the <Metadata Version> tag from the received hello message, as the version of the device information. In addition, the CPU 201 extracts the value of the <XAddrs> tag from the received hello message, as a URL for acquisition of the device information.

Then, the CPU 201 adds a new record to the device information management table 400 based on the extracted values and the IP address of a transmission source (sender) of the received hello message (step S604).

Then, the CPU 201 sends a get message, described hereinafter, to the URL extracted from the <XAddrs> tag (step S605). In the present example, it is assumed that the URL extracted from the <XAddrs> tag indicates the IP address of one of the printers 101 to 103.

For example, the get message has only a header section, and in the <Action> tag of the header section, it is indicated that the message is a get message. When one of the printers 101 to 103 receives the get message, the CPU 301 (see FIG. 3) sends a get response message to the device proxy server 121. The get response message is received by the CPU 201 of the device proxy server 121 (step S605).

The get response message has a body section thereof containing device information indicated by a <Metadata> tag. Within the <Metadata> tag, there are three metadata sections indicated by <Metadata Section> tags. The type of information contained in each of the metadata sections is defined by a tag immediately below the metadata section.

The first metadata section has a <This Device> tag, and device-specific information different from one device to another is stored in the <This Device> tag. A <Friendly Name> tag indicates a name assigned to the device, and a <Firmware Version> tag indicates the firmware version of the device. Further, a <Serial Number> tag indicates the serial number of the device. The second metadata section has a <This Model> tag, and device model-specific information different from one device model to another is stored in the <This Model> tag.

A <Manufacturer> tag indicates the name of a manufacturer of the device, and a <Manufacturer URL> tag indicates the URL of the device manufacturer. A <Presentation URL> tag indicates the URL of information on the device. A <Model Name> tag indicates the model name of the device.

The last metadata section has a <Relationship> tag, and this tag stores on an internal service provided by the device. In the present example, the internal service means a print service provided by a printer. Further, the <Relationship> tag has a <Hosted> tag immediately thereunder, and within the <Hosted> tag, there are an <Endpoint Reference> tag, a <Types> tag, and a <ServiceId> tag.

Within the <Endpoint Reference> tag, there is an <Address> tag, and the <Address> tag contains address information for use in utilizing services. The <Types> tag contains service type information. The <ServiceId> tag contains an identifier for identifying a service within the device.

When the get response message is received, the CPU 201 extracts the value of the <Friendly Name> tag as a device name and the value of the <Model Name> tag as a model name from the get response message. Further, the CPU 201 updates the record in the device information management table 400 according to the values extracted from the <Friendly Name> tag and the <Model Name> tag (step S606).

Furthermore, when updating the record in the device information management table 400, the CPU 201 stores the XML file per se of the received get response message in the hard disk 211, and sets the file path of the XML file as the XML storage path 409. Then, the CPU 201 terminates the present process.

On the other hand, if it is determined in the step S603 that the device information management table 400 has such a record (YES to the step S603), the CPU 201 extracts version information from the hello message (step S607). Then, the CPU 201 determines whether or not the record having the same UUID assigned thereto has the same version information (step S608).

If the version information is different (NO to the step S608), the process proceeds to the step S605. On the other hand, if the version information is identical (YES to the step S608), the CPU 201 terminates the present process.

FIG. 6 is a flowchart of a get message reception and get response message transmission process executed by each of the printers 101 to 103. The following description will be given assuming that the printer 101 has received a get message.

Referring to FIGS. 3 and 6, the CPU 301 determines whether or not a get message has been received (step S901). If a get message has been received (YES to the step S901), the CPU 301 sends the get response message to the device proxy server 121 (step S902), and then returns to the step S901. On the other hand, if no get message has been received (NO to the step S901), the CPU 301 waits.

Figure 7:
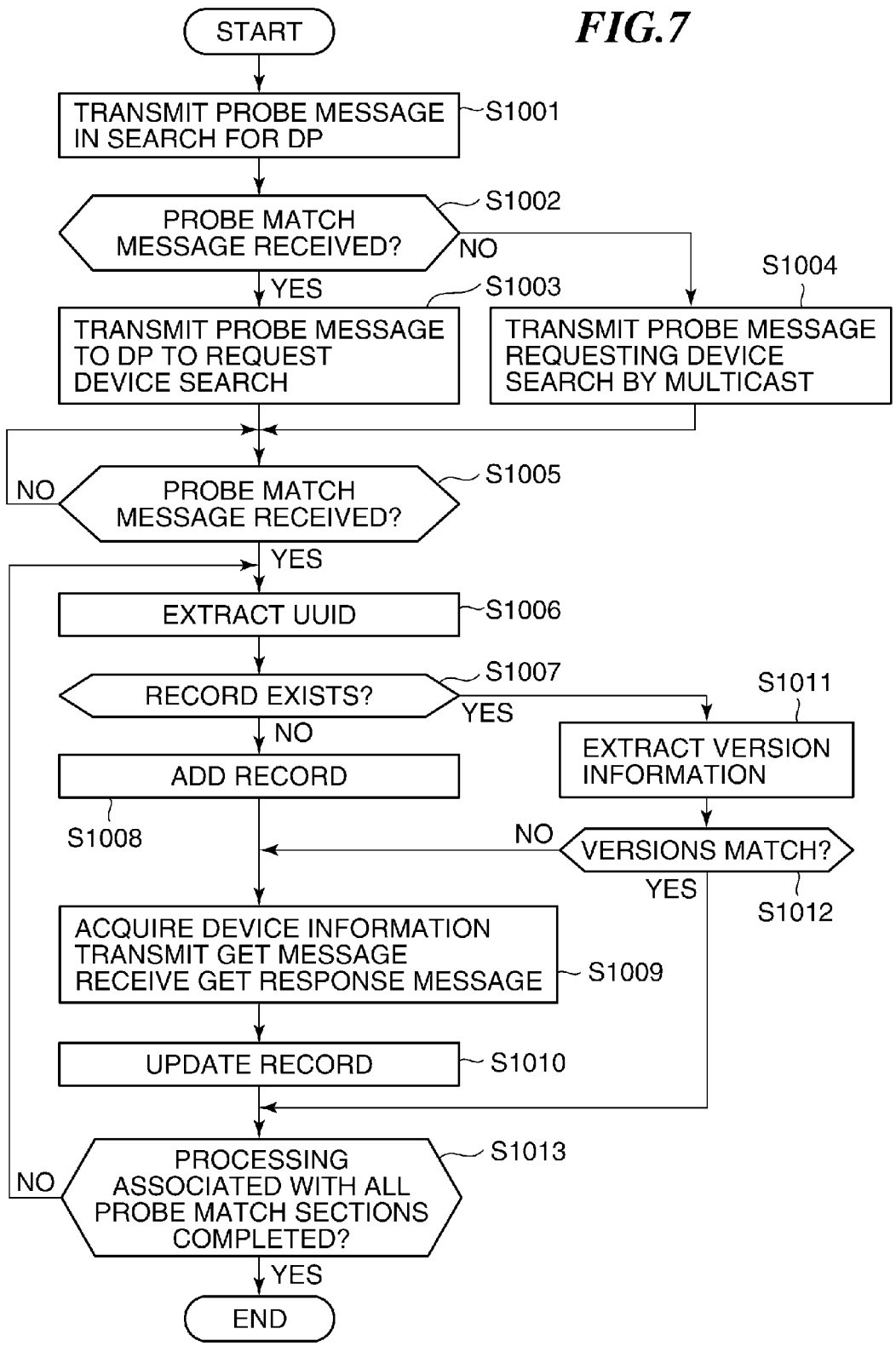
FIG. 7 is a flowchart of a printer search process executed by each client PC.

FIG. 7 is a flowchart of a printer search process executed by each of the client PCs 111 to 113.

In the following, the search process executed by the client PC 111 will be described with reference to FIGS. 2 and 7. Note that the search process is executed similarly by the other client PCs 112 and 113 as well.

In a case where the client PC 111 executes the printer search process, the CPU 201 searches for the device proxy server 121 by transmitting a probe message (first probe message), described hereinafter, by multicast (step S1001).

For example, the first probe message has a body section thereof containing a <Probe> tag, and the <Probe> tag indicates that the message is a probe message. Within the <Probe> tag, there is a <Types> tag, and "Device Proxy" (device proxy server) is designated in the <Types> tag.

Figure 8:
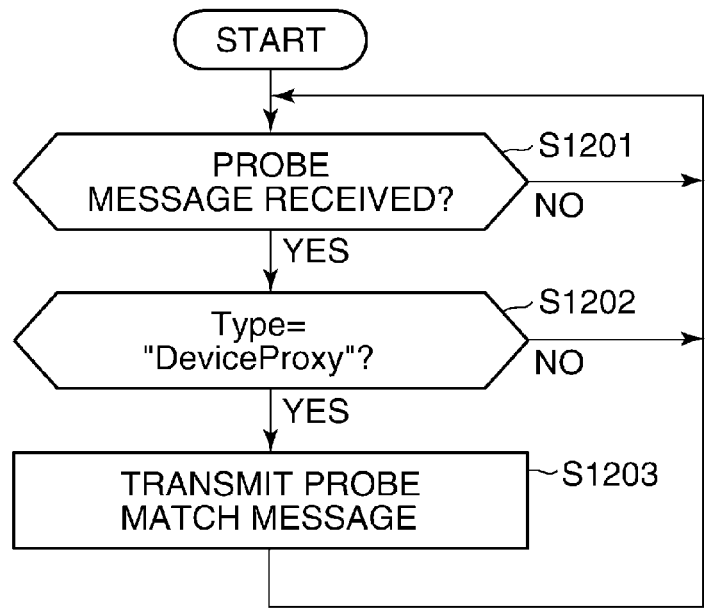
FIG. 8 is a flowchart of a search response process executed by the device proxy server in response to a device proxy server search request received from a client PC.

FIG. 8 is a flowchart of a search response process executed by the device proxy server 121 in response to a device proxy server search request received from one of the client PCs 111 to 113.

Referring to FIGS. 2 and 8, in the device proxy server 121, the CPU 201 monitors whether or not a first probe message has been received (step S1201). If no first probe message has been received (NO to the step S1201), the CPU 201 waits.

On the other hand, if a first probe message has been received (YES to the step S1201), the CPU 201 extracts the <Types> tag from the probe message and checks whether or not the <Types> tag indicates "Device Proxy" (step S1202).

If the <Types> tag indicates "Device Proxy" (YES to the step S1202), the CPU 201 sends a probe match message (first probe match message), described hereinafter, to the client PC 111 (step S1203). Then, the CPU 201 returns to the step S1201. On the other hand, if the <Types> tag does not indicate "Device Proxy" (NO to the step S1202), the CPU 201 immediately returns to the step S1201.

For example, the first probe match message has a body section thereof containing a <Probe Matches> tag, and the <Probe Matches> tag indicates that the message is a probe match message.

Within the <Probe Matches> tag, there is a probe match section indicated by a <Probe Match> tag. The probe match section corresponds to one research result. In the present example, a first probe match message in which a result of the search by the device proxy server 121 written in the probe match section is sent as a response.

Referring again to FIG. 7, in the client PC 111, after transmitting the probe message, as described hereinbefore, the CPU 201 monitors whether or not a first probe match message has been received from the device proxy server 121 (step S1002).

If a first probe match message has been received (YES to the step S1002), the CPU 201 sends another probe message (second probe message) to a URL extracted from an <XAddrs> tag in the first probe match message (i.e. to the device proxy server 121) (step S1003).

In the second probe message, "Printer" is designated in the <Types> tag, for example, whereby search for a printer device is designated.

Figure 9:
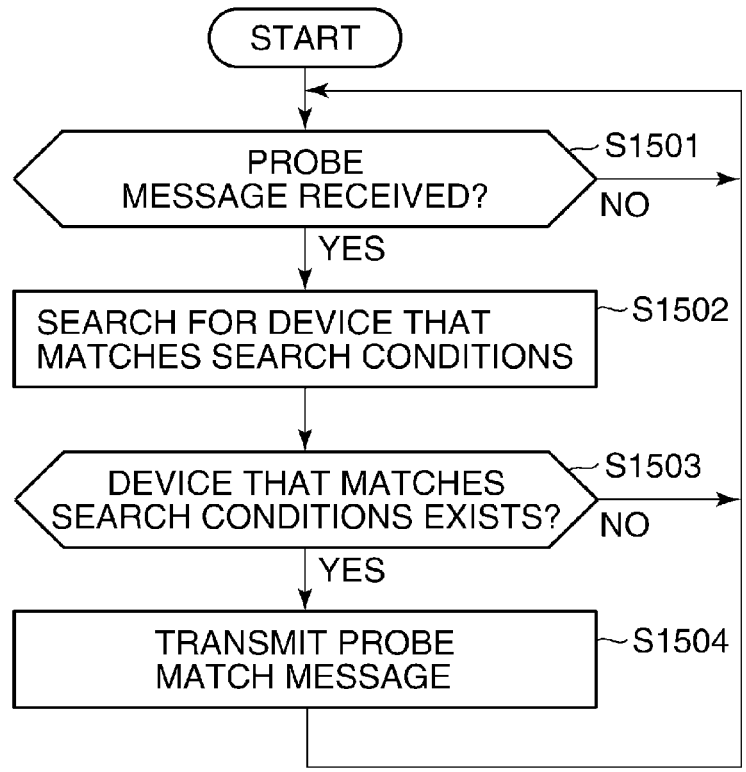
FIG. 9 is a flowchart of a process executed by the device proxy server in response to a device search request received from a client PC.

FIG. 9 is a flowchart of a process executed by the device proxy server 121 in response to a device search request received from one of the client PCs 111 to 113.

Referring to FIGS. 2 and 9, in the device proxy server 121, the CPU 201 monitors whether or not a second probe message has been received (step S1501). If no second probe message has been received (NO to the step S1501), the CPU 201 waits.

On the other hand, if a second probe message has been received (YES to the step S1501), the CPU 201 extracts the <Types> tag from the second probe message and searches the device information management table 400 stored in the hard disk 211, for a device that matches search conditions (step S1502). Then, the CPU 201 determines whether or not the device information management table 400 has a device that matches the search conditions (step S1503).

If the device information management table 400 has a device that matches the search conditions (YES to the step S1503), the CPU 201 sends another probe match message (second probe match message) to the client PC 111 (step S1504), and then returns to the step S1501.

If there is no device that matches the search conditions (NO to the step S1503), the CPU 201 immediately returns to the step S1501.

In the second probe match message, there can be two probe match sections each indicated by a <Probe Match> tag in a <Probe Matches> tag, for example. Each of the probe match sections corresponds to a single search result, and therefore, in this example, two search results are sent. Further, in the second probe match message, a URL indicated by an <XAddrs> tag in the <Probe Matches> tag is formed by the IP address of the device proxy server 121.

Referring again to FIG. 7, if the client PC 111 has received no first probe match message (NO to the step S1002), which means that there is no device proxy server 121 on the network, the CPU 201 designates "Printer" in the <Types> tag and transmits a probe message (third Probe message) by multicast (step S1004).

In the client PC 111, the CPU 201 monitors whether or not a second probe match message has been received (step S1005). If a second probe match message has been received (YES to the step S1005), the CPU 201 extracts the value of the <Address> tag in the <Endpoint Reference> tag from the second probe match message, as a UUID for globally identifying the device (step S1006).

Then, the CPU 201 checks whether or not there is a record having the same UUID as the extracted one (hereinafter referred to as "UUID matching record") in the device information management table 400 (step S1007). If there is no UUID matching record (NO to the step S1007), the CPU 201 adds a new record to the device information management table 400 stored in the hard disk 211 (step S1008).

Next, the CPU 201 extracts a URL described in the <XAddrs> tag from the second probe match message and sends the above-described get message to the URL (step S1009). Then, the CPU 201 receives a get response message associated with the get message.

In this case, information indicated by the <Endpoint Reference> tag of the second probe match message received in the step S1005 is inserted into the <To> tag of the get message to be transmitted by the CPU 201.

Then, in the client PC 111, the CPU 201 refers to information in the received get response message and updates the record in the device information management table 400 stored in the hard disk 211 (step S1010).

Further, in the step S1010, the CPU 201 stores the XML file of the received get response message in the hard disk 211. Furthermore, the CPU 201 stores the file path of the XML file as an XML storage path in the device information management table 400.

By the way, if the device proxy server 121 is designated as the destination of the get message in the step S1009, the get response message received in the same step contains a <Hosted> tag in which "Device Proxy Eventing Service Type" is designated by the <Types> tag, for example.

On the other hand, if one of the printers 101 to 103 is designated as the destination of the get message in the step S1009, the get response message received in the same step does not contain the <Hosted> tag in which "Device Proxy Eventing Service Type" is designated by the <Types> tag, for example.

In this case, the CPU 201 sends an event registration request (subscribe request) to a URL indicated by "Printer Service Type", to thereby directly perform event registration in one of the printers 101 to 103.

Note that the URL extracted in the step S1009 corresponds to the address of one of the printers 101 to 103 or that of the device proxy server 121 according to the answer of the question of the step S1002.

For example, if it is determined in the step S1002 that the first probe match message has been received (YES to the step S1002), the CPU 201 issues a device search request to the device proxy server 121 in the step S1003. Then, in the step S1005, the CPU 201 receives the second probe match message from the device proxy server 121. Therefore, in the second probe match message, the <XAddrs> tag is formed by the IP address of the device proxy server 121.

On the other hand, if it is determined in the step S1002 that no first probe match message has been received (NO to the step S1002), the CPU 201 issues the device search request by multicast in the step S1004. Therefore, in the step S1005, the CPU 201 receives the probe match message from one of the printers 101 to 103 as the second probe match message. In this case, therefore, the <XAddrs> tag in the second probe match message is formed by the IP address of the printer.

If it is determined in the step S1007 that there is a UUID matching record (YES to the step S1007), the CPU 201 extracts version information from the second probe match message (step S1011). Then, the CPU 201 determines whether or not the version information is the same (step S1012). If the version information is different (NO to the step S1012), the process proceeds to the step S1009.

On the other hand, if the version information matches that of the UUID matching record (YES to the step S1012), the process proceeds to a step S1013, described hereinafter.

Figure 10:
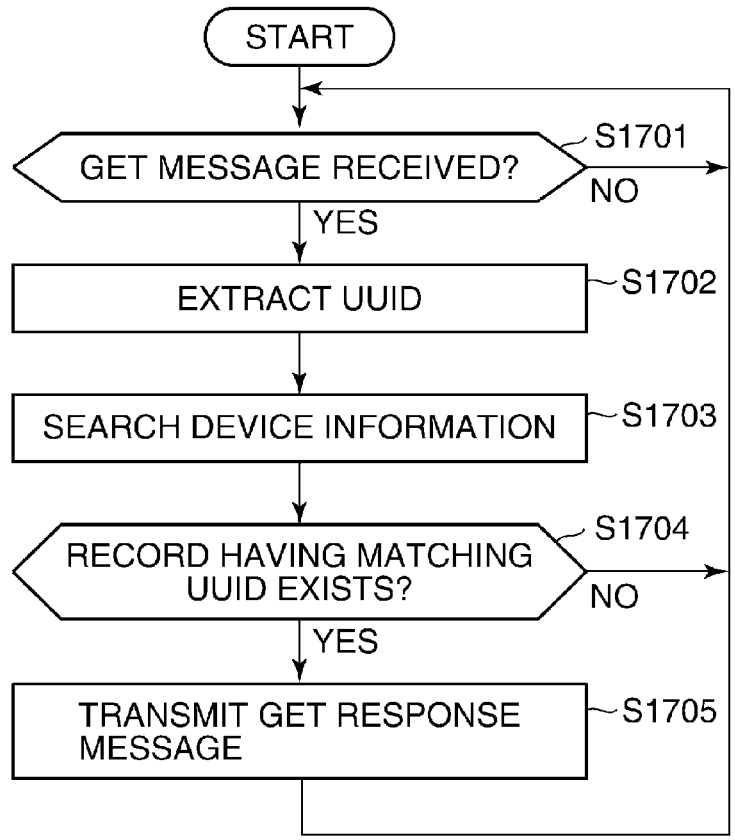
FIG. 10 is a flowchart of a process executed by the device proxy server when a get message is received from a client PC in the process shown in FIG. 7.

FIG. 10 is a flowchart of a process executed by the device proxy server 121 when a get message is received from the client PC 111 in the process shown in FIG. 7.

Referring to FIGS. 2 and 10, in the device proxy server 121, the CPU 201 monitors whether or not a get message has been received (step S1701). If no get message has been received (NO to the step S1701), the CPU 201 waits. On the other hand, if a get message has been received (YES to the step S1701), the CPU 201 extracts the value of the <To> tag from the get message, as a UUID for globally identifying the device (step S1702).

Then, the CPU 201 searches the device information management table 400 for a record having the same UUID as the extracted one (device information search: step S1703). Then, the CPU 201 determines whether or not there is a record having the same UUID as the extracted one (step S1704).

If there is a record having the same UUID as the extracted one (YES to the step S1704), the CPU 201 sends a get response message, described hereinafter, to the client PC 111 (step S1705), and then returns to the step S1701.

If there is no record having the same UUID as the extracted one (NO to the step S1704), the CPU 201 immediately returns to the step S1701.

The get response message transmitted in the step S1705 is generated based on the device information management table 400 stored e.g. in the hard disk 211 of the device proxy server 121. This get response message contains two hosted sections in a <Metadata> tag.

A first hosted section indicates the device information found in the device information management table 400 in the step S1703. A second hosted section indicates information on the device proxy server 121 itself. In the second hosted section, "Device Proxy Eventing Service Type" is designated as <Types>, and the URL formed by the IP address of the device proxy server 121 is designated in the <Address> tag.

As described hereinafter, the client PC 111 can send an event registration request (subscribe request) to the aforementioned URL to thereby issue the event registration request to the device via the device proxy server 121.

Referring again to FIG. 7, in the client PC 111, the CPU 201 determines whether or not processing associated with all the probe match sections included in the second probe match message receeved in the step S1005 has been completed (step S1013). If the processing for processing associated with all the probe match sections has not been completed yet (NO to the step S1013), the CPU 201 returns to the step S1006 and continues the process.

On the other hand, if the processing associated with all the probe match sections has been completed (YES to the step S1013), the CPU 201 terminates the present process. If it is determined in the step S1005 that no second probe match message has been received (NO to the step S1005), the CPU 201 waits.

Figure 11:
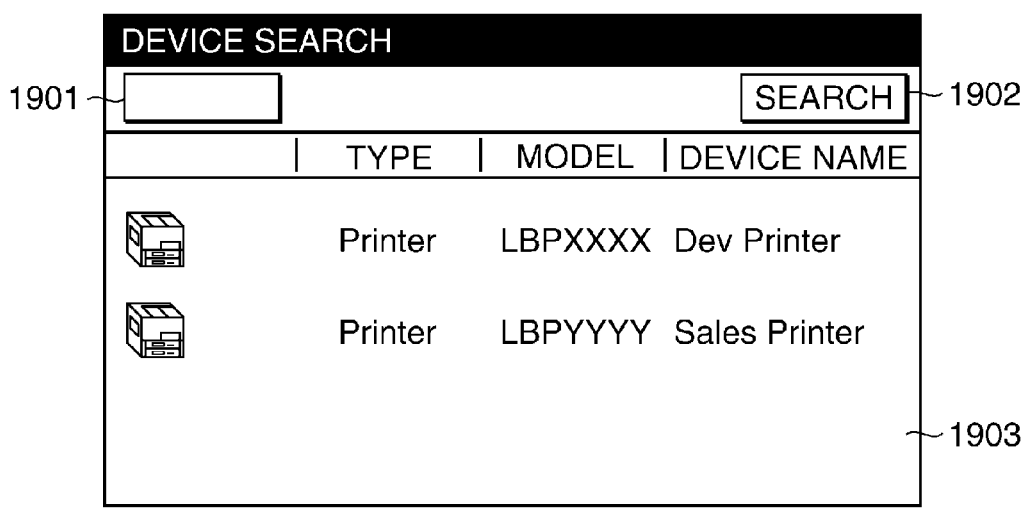
FIG. 11 is a view illustrating an example of a user interface (UI) for use by a client PC in displaying information on devices found by device search.

FIG. 11 is a view illustrating an example of a user interface (UI) for use by each of the client PCs 111 to 113 in displaying information on devices found by device search.

Referring to FIG. 11, an area 1901 is displayed on the user interface, and the type of a device to be searched for is designated in this area 1901. For example, a keyword, such as "MFP" or "Printer", can be entered in the area 1901. If no keyword has been input in the area 1901, the CPU 201 searches for all types of devices. A button 1902 is pressed for starting the above-described device search, and an area 1903 displays the result of the search.

Figure 12:
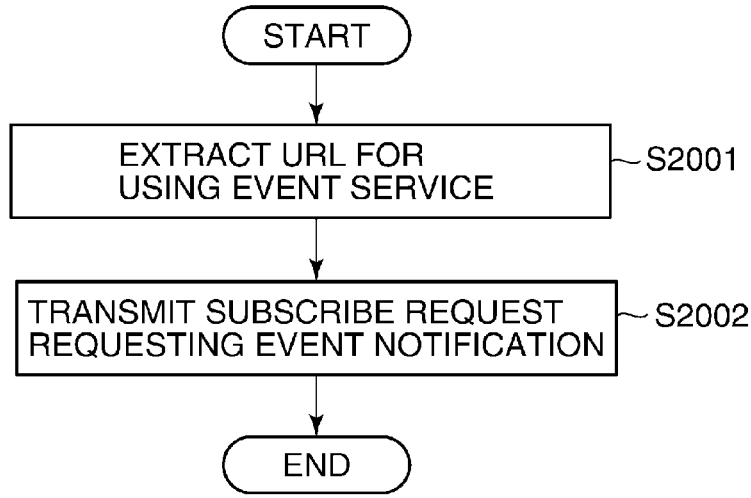
FIG. 12 is a flowchart of an event registration process executed by a client PC in association with a device found by device search.

FIG. 12 is a flowchart of an event registration process executed by each of the client PCs 111 to 113 in association with a device found by device search. The following description will also be given assuming that event registration is performed by the client PC 111.

Referring to FIGS. 3 and 12, in the client PC 111, the CPU 201 extracts the URL of an event registration request destination from the get response message stored in the hard disk 211 (step S2001). When device information has been acquired from the device proxy server 121 in the step S1009 in FIG. 7, the URL of the event registration request destination is formed by the IP address of the device proxy server 121.

On the other hand, when device information has been acquired from one of the printers 101 to 103 in the step S1009 in FIG. 7, the URL of the event registration request destination is formed by the IP address of the printer.

Then, the CPU 201 sends a subscribe request to the URL of the event registration request destination (step S2002). In the subscribe request sent to the device proxy server 121, a wsa:Filter section indicates that notification is needed when the status of an event indicated by "Printer Status Event" changes (i.e. when an event occurs) (notification request).

Further, a wsa:To section indicates the URL of an apparatus that provides services for event notification. This URL corresponds to a URL indicated by the <Address> tag in the <Hosted> tag of the get response message received in the step S1009 in FIG. 7 in which Printer Service Type is designated by the <Types> tag of the <Hosted> tag.

A wsa:Reply To section indicates the URL of an endpoint which is to receive a response to the message. In the present example, the URL corresponds to the URL of the client PC 111.

Figure 13:
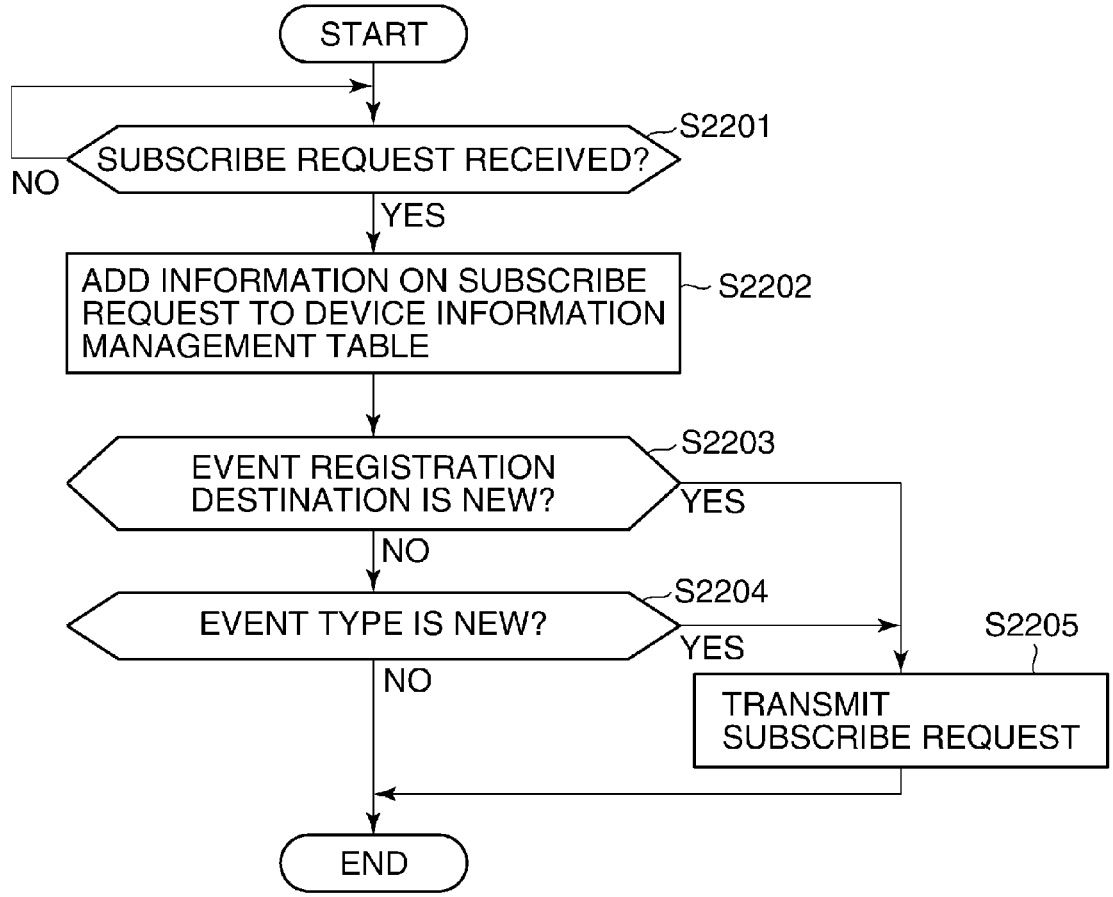
FIG. 13 is a flowchart of a process executed by the device proxy server for transferring a subscribe request received from a client PC to a printer.

FIG. 13 is a flowchart of a process executed by the device proxy server 121 for receiving a subscribe request from one of the client PCs 111 to 113 and transferring the subscribe request to one of the printers 101 to 103. The following description will be given assuming that the device proxy server 121 has received the subscribe request from the client PC 111.

Referring to FIGS. 2 and 13, in the device proxy server 121, the CPU 201 monitors whether or not a subscribe request has been received (step S2201). If no subscribe request has been received (NO to the step S2201), the CPU 201 waits.

On the other hand, if a subscribe request has been received (YES to the step S2201), the CPU 201 adds information on the received subscribe request as proxy event information to a device information management table 2300, described hereinafter, stored in the hard disk 211 (step S2202).

FIG. 14 is a diagram showing an example of proxy event information stored in the hard disk 211 in the device proxy server 121.

Referring to FIG. 14, the device information management table 2300 stores each of proxy event information items as a record. Each record comprises an ID 2301, an event registration destination URL 2302, an event notification destination URL 2303, an event type 2304, and an entry in a yet-to-be-transmitted error recovery event list 2305.

The ID 2301 is used by the device proxy server 121 for identifying proxy event information. The event registration destination URL 2302 indicates a service URL of an event registration destination. The event registration destination URL 2302 corresponds to information indicated by the wsa:To tag. The event notification destination URL 2303 indicates the URL of a client PC having transmitted the subscribe request (sender of the subscribe request), and corresponds to information indicated by the wsa:Reply To tag. The event type 2304 indicates the type of an event desired to be notified of, and corresponds to information indicated by the wsa:Filter.

As described hereinafter, when an event of an event type indicated by the event type 2304 is received from a device indicated by the event registration destination URL 2302, the device proxy server 121 sends an event message to a client PC indicated by the event notification destination URL 2303.

Each entry in the yet-to-be-transmitted error recovery event list 2305 indicates an error recovery event which has not been sent to an event notification destination URL yet after transmission of an error event to the event notification destination URL. Information in the entry of this list includes the message ID of an error event transmitted to an event notification destination URL and a type of an error that occurred.

The device proxy server 121 periodically queries a device indicated by the event registration destination URL 2302 to confirm whether or not an error has been eliminated. When it is confirmed that the error has been eliminated, the device proxy server 121 sends an error recovery event to event notification destination URLs. When the error recovery event is sent to the event notification destination URLs, the CPU 201 of the device proxy server 121 deletes an associated message ID from the yet-to-be-transmitted error recovery event list.

Referring again to FIGS. 2 and 13, in the device proxy server 121, the CPU 201 determines whether or not the event registration destination URL 2302 of the record additionally added to the device information management table 2300 is new (step S2203). If the event registration destination URL 2302 is not new (NO to the step S2203), the CPU 201 checks whether or not the event type 2304 is new (step S2204). If the event type 2304 is not new (NO to the step S2204), the CPU 201 terminates the present process.

More specifically, the fact that the event type 2304 is not new means that the same event type already exists. In this case, the subscribe request associated with the same event type has already been sent to the event registration destination URL, and therefore the CPU 201 immediately terminates the present process.

On the other hand, if the event registration destination URL 2302 is new (YES to the step S2203), the CPU 201 sends an XML-formatted subscribe request to a URL indicated by the event registration destination URL 2302 (step S2205). Note that if it is determined in the step S2204 that the event type 2304 is new (YES to the step S2204), the process also proceeds to the step S2205.

In the subscribe request transmitted by the CPU 201 in the step S2205, a wsa:Filter section indicates that notification is needed when the status of an event indicated by "Printer Status Event" changes (i.e. when an event occurs). A wsa:To section indicates the URL of an apparatus or device that provides services for event notification. The URL corresponds to the URL of the event registration destination URL 2302.

A wsa:Reply To section indicates the URL of an endpoint which is to receive a response to the message. In the present example, the URL corresponds to the URL of the device proxy server 121. In each of the printers 101 to 103, the CPU 301 receives the subscribe request, and then stores an event type to be notified of and event notification destination information in the RAM 302 in association with each other.

FIG. 15 is a diagram showing an example of event registration information stored in the RAM 302 of each of the printers 101 to 103.

Referring to FIG. 15, an event registration information table 2500 stores event registration information from each registration (subscribe) source as a record. An ID 2501 is assigned to each record of event registration information so that each of the printers 101 to 103 can identify the event registration information. An event notification destination URL 2502 indicates the URL of a destination to which a notification of occurrence of an event is to be sent.

When the device proxy server 121 has performed the registration (subscription), the event notification destination URL 2502 indicates the URL of the device proxy server 121. On the other hand, when one of the client PCs has performed the registration (subscription), the event notification destination URL 2502 indicates the URL of the client PC. An event type 2503 indicates the type of an event to be notified of, and corresponds to information indicated e.g. by the aforementioned wsa:Filter.

The RAM 302 is a volatile memory, as described hereinbefore, and hence when the power is turned off, information stored in the event registration information table 2500 stored therein is all cleared.

Figure 16:
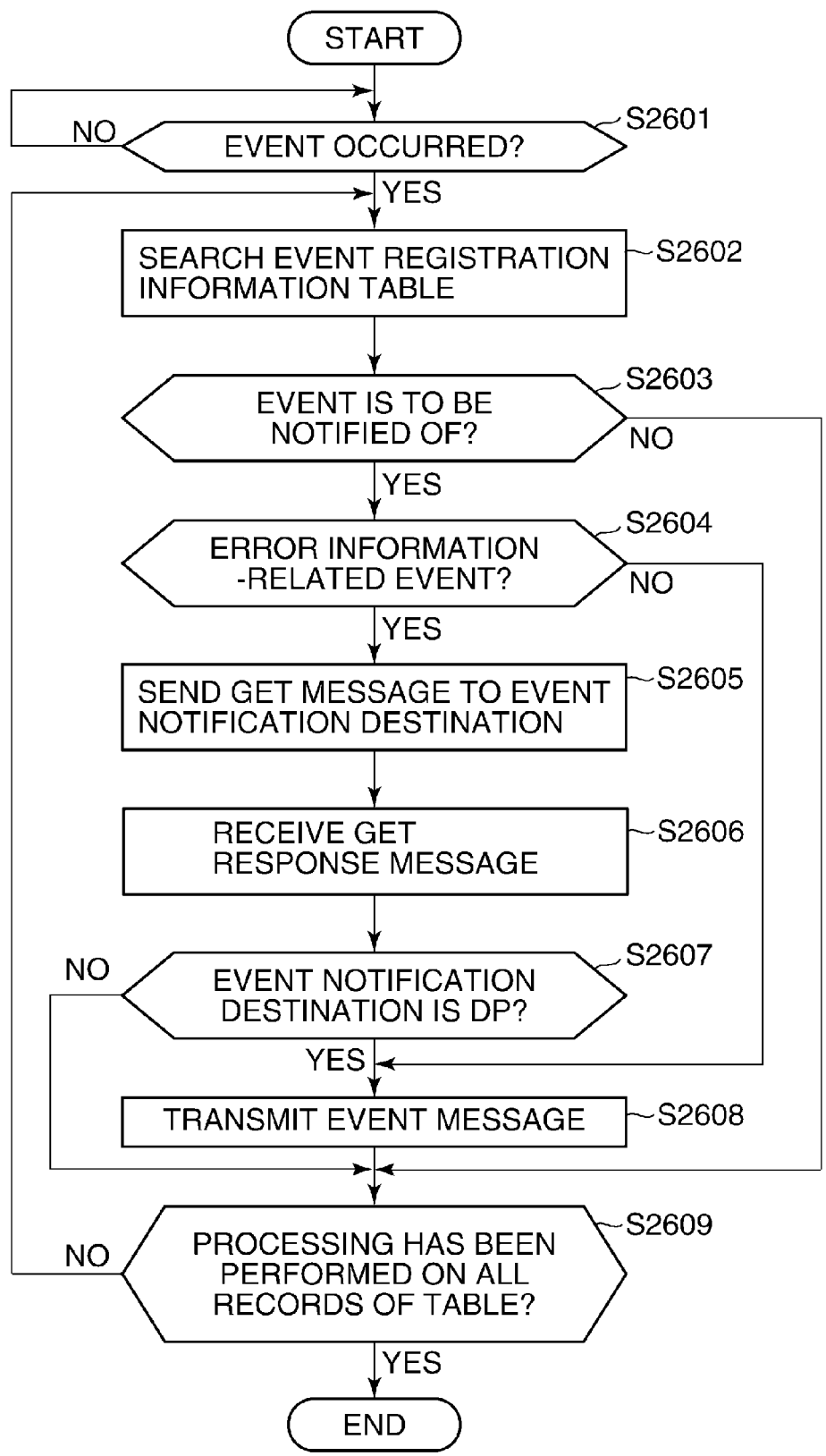
FIG. 16 is a flowchart of an event handling process executed by a printer when an event occurs in the printer.

FIG. 16 is a flowchart of an event handling process executed by each of the printers 101 to 103 when an event occurs in the printer. Note that the following description will be given of the printer 101 by way of example.

Referring to FIGS. 3 and 16, e.g. when an event related to a change in the status of a job, an error event, an event related to a change of an option device or the like, or an event related to a change in settings occurs, the process shown in FIG. 16 is started.

In the printer 101, the CPU 301 monitors whether or not an event has occurred (step S2601). If no event has occurred (NO to the step S2601), the CPU 301 waits. On the other hand, if an event has occurred (YES to the step S2601), the CPU 301 searches the event registration information table 2500 stored in the RAM 302 (step S2602).

Then, the CPU 301 checks whether or not the event having occurred has been stored in the event registration information table 2500, as an event type to be notified of (step S2603). If the event having occurred has been stored as an event type to be notified of (YES to the step S2603), the CPU 301 checks whether or not the event having occurred is an error-related event (i.e. an error event) (step S2604).

If the event having occurred is an error event (YES to the step S2604), the CPU 301 sends a get message to an event notification destination URL (step S2605). Then, the CPU 301 awaits reception of a get response message, described hereinafter.

The CPU 301 receives the get response message from the event notification destination URL (step S2606). Then, the CPU 301 determines whether or not the transmission source of the received get response message is the device proxy server 121 (step S2607).

For example, when the get response message has a <Hosted> tag in which <Types> designates "Device Proxy Eventing Service Type", this indicates that the transmission source of the get response message is the device proxy server 121.

If the transmission source of the get response message (i.e. the event notification destination) is the device proxy server 121 (YES to the step S2607), the CPU 301 sends an event message (status event report message) to the event notification destination URL (step S2608).

In the present example, it is assumed that a service call error occurs and a status event report message related to the service call error is transmitted. More specifically, when occurrence of the service call error is detected, the CPU 301 transmits the status event report message for notification of the error event.

Thereafter, the CPU 301 determines whether or not search and processing has been completely performed on all the records of the event registration information table 2500 (step S2609). If search and processing has not been completely performed on all the records of the event registration information table 2500 (NO to the step S2609), the CPU 301 returns to the step S2602 and continues the processing.

On the other hand, if search and processing has been completely performed on all the records of the event registration information table 2500 (YES to the step S2609), the CPU 301 terminates the present process.

If it is determined in the step S2607 that the transmission source of the get response message is not the device proxy server 121 (NO to the step S2607), the process proceeds to the step S2609.

Further, if it is determined in the step S2604 that the event having occurred is not an error event (NO to the step S2604), the process proceeds to the step S2608, wherein the CPU 301 sends an event message to the event notification destination URL.

Further, if it is determined in the step S2603 that the event having occurred is not an event type to be notified of (NO to the step S2603), the process proceeds to the step S2609.

Figure 17:
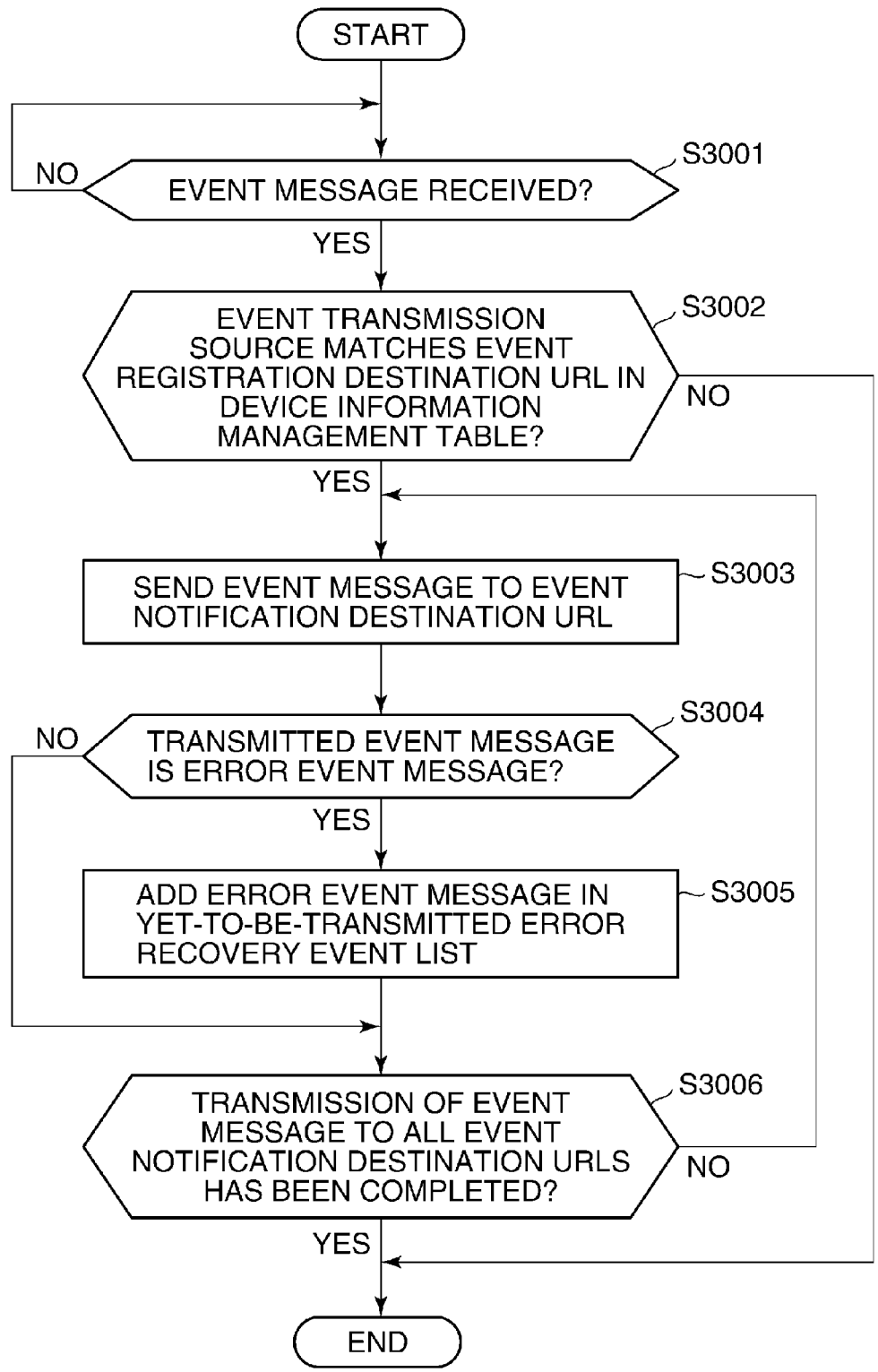
FIG. 17 is a flowchart of a process executed by the device proxy server for transferring an event message received from a printer to a client PC.

FIG. 17 is a flowchart of a process executed by the device proxy server 121 for transferring event messages received from the printers 101 to 103 to the client PCs 111 to 113. The following description will be given assuming that an event message is received from the printer 101.

Referring to FIGS. 2 and 17, in the device proxy server 121, the CPU 201 monitors reception of an event message (step S3001). If no event message has been received (NO to the step S3001), the CPU 201 waits.

On the other hand, if an event message has been received (YES to the step S3001), the CPU 201 checks whether or not the event transmission source of the received event message has been registered as an event registration destination URL in the device information management table 2300 stored in the hard disk 211 (step S3002).

If the event transmission source of the received event message has been registered as an event registration destination URL (YES to the step S3002), the CPU 201 sends the event message to an URL indicated by an event notification destination URL 2303 on a record associated with the event registration destination URL 2302 (step S3003).

Then, the CPU 301 checks whether or not the transmitted event message is an error event message (step S3004). If the transmitted event message is an error event message (YES to the step S3004), the CPU 201 additionally registers the message ID (yet-to-be-transmitted error recovery information) of the transmitted error event message (also referred to as "the error message") in the yet-to-be-transmitted error recovery event list 2305 an entry thereof of the same record (step S3005).

Then, the CPU 201 determines whether or not transmission of the event message to all the event notification destination URLs has been completed (step S3006). More specifically, when a plurality of event notification destination URLs 2303 have been registered in association with the event registration destination URL 2302, the CPU 201 determines whether or not event transmission processing has been completely performed on all the event notification destination URLs 2303.

If transmission of the event message to all the event notification destination URLs 2303 has not been completed (NO to the step S3006), the CPU 201 returns to the step S3003 and continues the processing. On the other hand, if transmission of the event message to all the event notification destination URLs 2303 has been completed (YES to the step S3006), the CPU 201 terminates the present process.

If it is determined in the step S3002 that the event transmission source has not been registered as an event registration destination URL (NO to the step S3002), the CPU 201 immediately terminates the present process.

Figure 18:
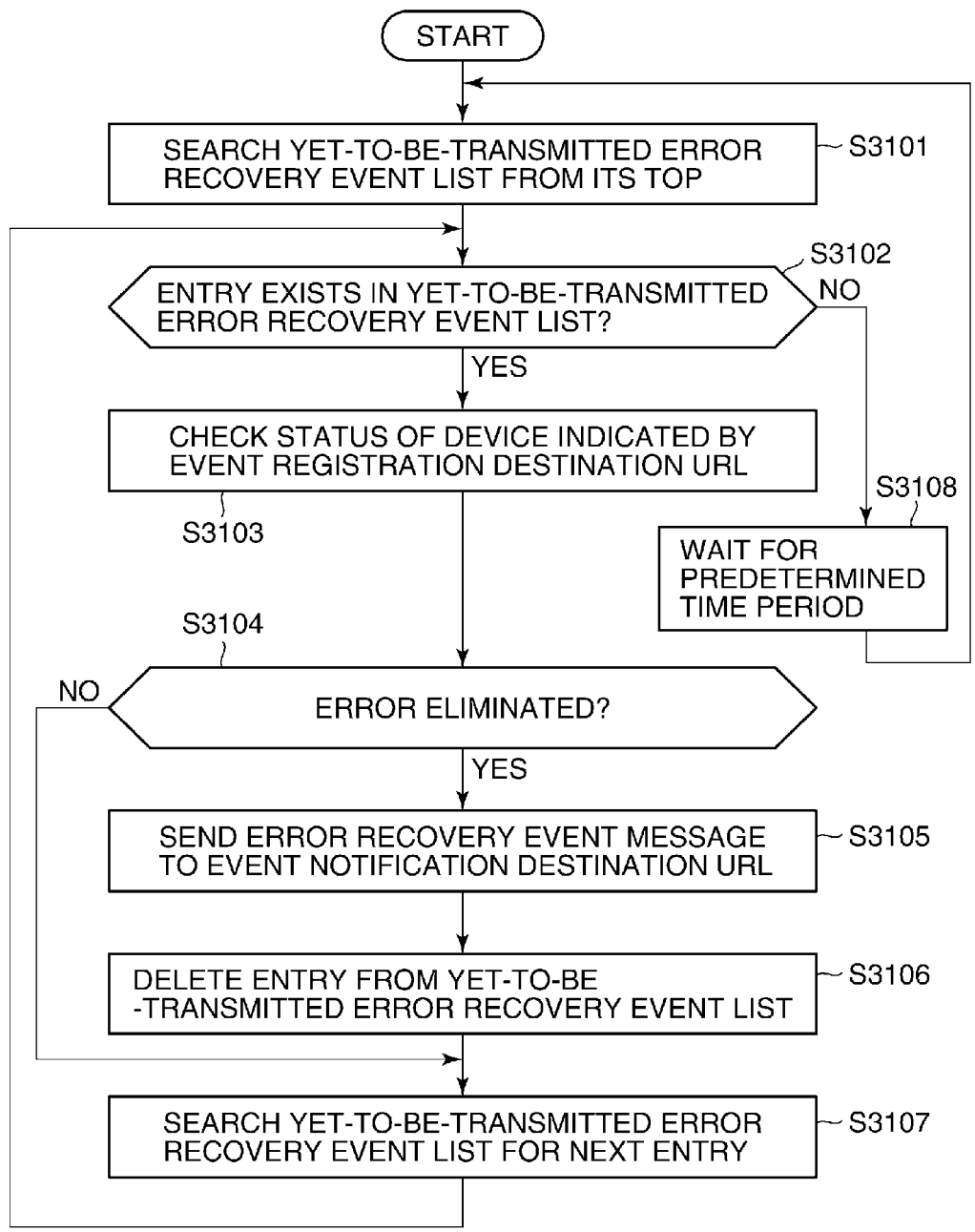
FIG. 18 is a flowchart of a process executed by the device proxy server for confirming an error recovery state of a printer and transmitting a recovery event message to a client PC.

FIG. 18 is a flowchart of a process executed by the device proxy server 121 for checking an error recovery state of any of the printers 101 to 103 and transmitting an error recovery event message to the client PCs 111 to 113.

Referring to FIGS. 2 and 18, first, the CPU 201 of the device proxy server 121 searches the yet-to-be-transmitted error recovery event list 2305 from its top (step S3101). Then, the CPU 201 determines whether or not the yet-to-be-transmitted error recovery event list 2305 has an entry associated with an error recovery event message yet to be transmitted (step S3102).

If the yet-to-be-transmitted error recovery event list 2305 has an entry associated with an error recovery event yet to be transmitted (YES to the step S3102), the CPU 201 checks the status of a printer indicated by the associated event registration destination URL (step S3103). Note that various methods of checking the status of a printer are known.

Then, the CPU 201 determines whether or not the error has already been eliminated (step S3104). If it is confirmed that the error indicated by the entry in the yet-to-be-transmitted error recovery event list 2305 has already been eliminated (YES to the step S3104), the CPU 201 sends an error recovery event message to the event notification destination URLs (step S3105).

Then, the CPU 201 deletes the entry associated with the transmitted error recovery event message from the yet-to-be-transmitted error recovery event list 2305 (step S3106). Next, the CPU 201 searches the yet-to-be-transmitted error recovery event list 2305 for a next entry (step S3107), and returns to the step S3102 to continue the processing.

Note that if the yet-to-be-transmitted error recovery event list 2305 has no entry associated with an error recovery event message yet to be transmitted (NO to the step S3102), the CPU 201 waits over a predetermined time period (fixed time period) (step S3108), and returns to the step S3101 to continue the processing.

Further, if the error indicated by the data item in the yet-to-be-transmitted error recovery event list 2305 has not been eliminated yet (NO to the step S3104), the process proceeds to the step S3107.

As described above, according to the first embodiment, when an error event occurs in one of the printers 101 to 103 and the event registration source is the device proxy server 121, the printer sends an error event message to the device proxy server 121. Then, the device proxy server 121 receives the error event message from the printer and transfers the event message to the client PCs 111 to 113.

Next, the device proxy server 121 periodically checks (i.e. checks at a predetermined repetition period) the printer as to whether or not the error has been eliminated. Knowing that the error has been eliminated, the device proxy server 121 sends the error recovery event message to the client PCs 111 to 113.

Thus, each of the client PCs 111 to 113 can receive an error event message and an error recovery event message to thereby grasp the error status of each of the printers 101 to 103 in real time.

In summary, according to the first embodiment, a proxy server monitors and checks the error occurrence status of a printer, and sends an error recovery message to a client PC when an error is eliminated. This enables the client PC to reliably know recovery of the printer from the error. As a result, even when the printer cannot store event registration information in a nonvolatile storage medium, the client PC can check elimination of the error by making use of the error recovery message.

In the first embodiment, when an event occurs in one of the printers 101 to 103, the get message is used, as described with reference to FIG. 16, so as to check whether or not the event notification destination is the device proxy server 121. A second embodiment is distinguished from the first embodiment in that the subscribe request transmitted to the printers 101 to 103 by the CPU 201 of the device proxy server 121 in the step S2205 in FIG. 13 contains a tag indicating that the request is from the device proxy server 121.

Accordingly, the CPU 301 of each of the printers 101 to 103 determines, based on the contents of the received subscribe request, whether the request source is the device proxy server 121 or one of the client PCs 111 to 113. Then, the CPU 301 stores event registration information, described hereinafter, in the RAM 302.

Figure 19:
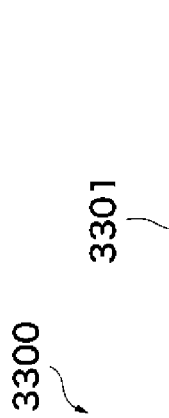
FIG. 19 is a diagram showing an example of event registration information stored in a RAM in a printer.

FIG. 19 is a diagram showing an example of event registration information stored in the RAM 302.

Referring to FIG. 19, an event registration information 3300 includes an event notification destination type 3301 in addition to an ID, an event notification destination URL, and an event type. This event notification destination type 3301 indicates whether a request source is the device proxy server 121 or one of the client PCs 111 to 113.

More specifically, the CPU 301 can determine, based on the event notification destination type 3301, whether an apparatus indicated by an event notification destination URL is the device proxy server 121 or one of the client PCs 111 to 113.

Figure 20:
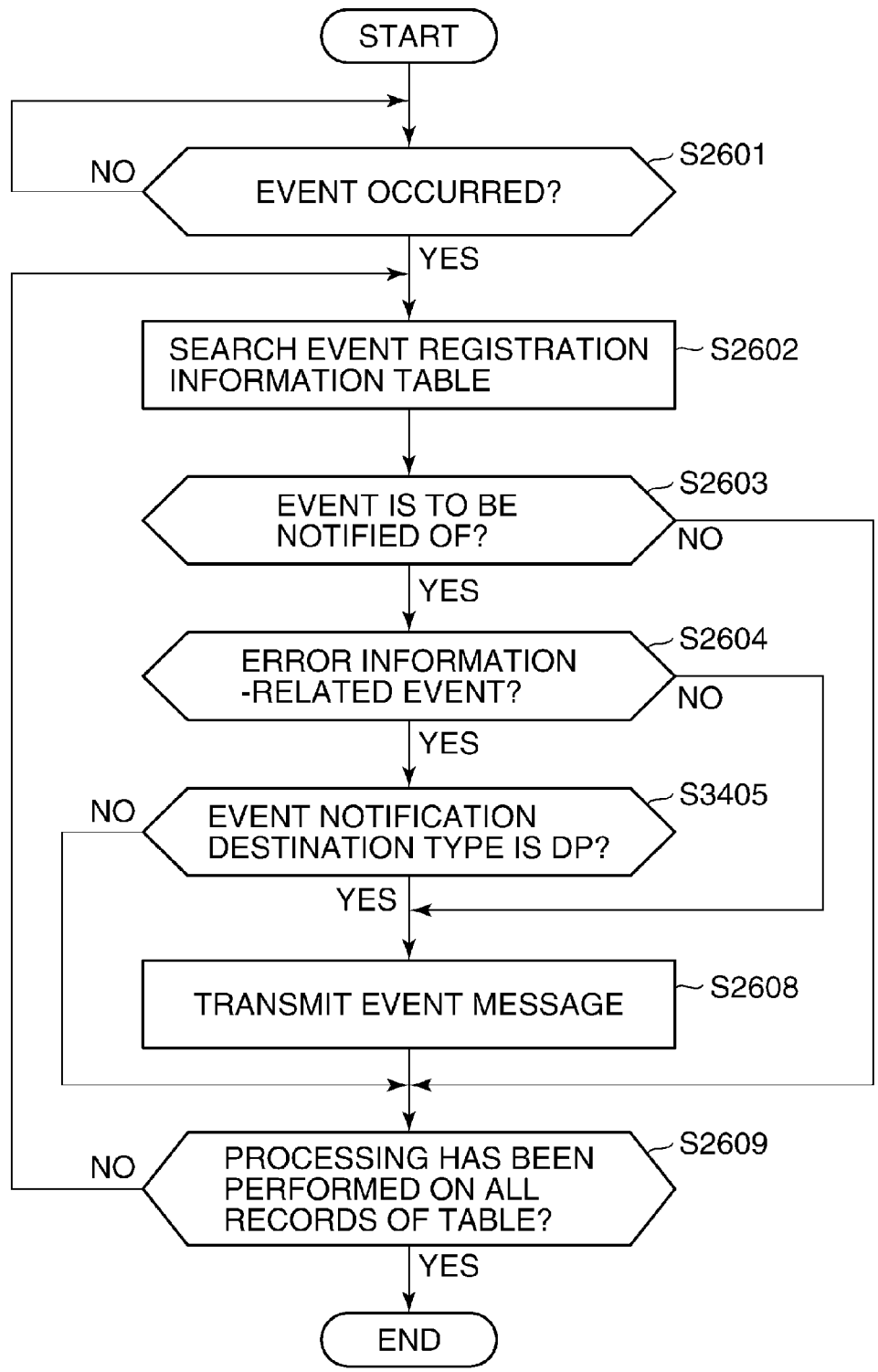
FIG. 20 is a flowchart of an event handling process executed by a printer when an event occurs in the printer.

FIG. 20 is a flowchart of an event handling process executed by one of the printers 101 to 103 when an event occurs in the printer.

In the first embodiment, when an event occurs in one of the printers 101 to 103, the get message is transmitted in the step S2605, and the get response message is received in the step S2606, as described with reference to FIG. 16.

In the second embodiment, instead of executing the steps S2605 and S2606, the CPU 301 refers to the event registration information 3300 and determines whether or not the event notification destination type indicates the device proxy server 121 (step S3405).

If the event notification destination type indicates the device proxy server 121 (YES to the step S3405), the process proceeds to the step S2608 described with reference to FIG. 16. On the other hand, if the event notification destination type does not indicate the device proxy server 121 (NO to the step S3405), the process proceeds to the step S2609 described with reference to FIG. 16.

Note that in FIG. 20, steps identical to those in FIG. 16 are denoted by identical step numbers.

Thus, in the second embodiment, the number of the steps to be executed by the CPU 301 is smaller than in the first embodiment, so that it is possible to improve performance in event message transmission executed when an event occurs.

As is apparent from the above description, in the device proxy server 121, the CPU 201 functions as a monitoring unit, a transfer unit, and a notification unit. Further, the CPU 201 and the hard disk 211 function as a storage unit. On the other hand, in each of the printers 101 to 103, the CPU 301 functions as first and second event notification units, an error determination unit, and a notification destination-determining unit.

Note that the present invention is not limited to the above-described embodiments, but it can be practiced in various forms, without departing from the spirit and scope thereof.

For example, the functions of either of the above-described embodiments can be accomplished by causing the device proxy server 121 and the printers 101 to 103 to execute the functions as a communication control method. Further, the functions of either of the above-described embodiments may be accomplished by causing a computer incorporated in each of the device proxy server 121 and the printers 101 to 103 to execute a program implementing the functions, as a communication control program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-175573 filed Aug. 4, 2010, which is hereby incorporated by reference herein in its entirety.

What is claimed is:

1. An information processing apparatus, comprising:
a connecting unit configured to connect to a plurality of terminal apparatuses and a plurality of client apparatuses via a network;
a setting unit configured to set, in a case where a first notification request indicating that a first event message is needed when an event occurs in a first terminal apparatus among the plurality of terminal apparatuses is received from a first client apparatus among the plurality of client apparatuses, the first client apparatus as an event notification destination and the first terminal apparatus as an event registration destination based on the first notification request;
a transmitting unit configured to transmit to the set event registration destination, in the case where the first notification request is received, a second notification request indicating that a second event message is needed when the event occurs in the first terminal apparatus;
a reception unit configured to receive the second event message from the first terminal apparatus, in response to the second notification request;
a transfer unit configured to transfer the second event message received by said reception unit as the first event message to the first client apparatus, in response to the first notification request;
a querying unit configured to be operable, when the second event message transferred to the first client apparatus is related to an error event indicative of an error having occurred in the first terminal apparatus, to query the set event registration destination regarding whether or not the error has been eliminated in the first terminal apparatus; and
a notification unit configured to send an error recovery message indicative of elimination of the error to the set event notification destination, when a response indicating that the error has been eliminated is received from the first terminal apparatus.

2. The information processing apparatus according to claim 1, further comprising a storage unit configured to be operable, when the second event message transferred to the first client apparatus is related to the error event indicative of the error having occurred in the first terminal apparatus, to hold information indicating that an error recovery message associated with the error event has not been transmitted yet, until the error recovery message is transmitted.

3. The information processing apparatus according to claim 1, wherein the information processing apparatus or another client apparatus of the plurality of client apparatuses is registered in the first terminal apparatus as another event notification destination in association with the event, and
wherein the first terminal apparatus includes a first event notification unit configured to be operable, when the event having occurred in the first terminal apparatus is a registered event registered in advance as a notification-requiring event, to notify the another event notification destination, which is registered in advance of the registered event.

4. The information processing apparatus according to claim 3, wherein the first terminal apparatus further comprises:
an error determination unit configured to be operable, when the event having occurred in the first terminal apparatus is the registered event registered in advance as the notification-requiring event, to determine whether or not the event is the error event;
a notification destination-determining unit configured to be operable, when the event is determined to be the error event, to determine whether or not the another event notification destination is the information processing apparatus; and
a second event notification unit configured to be operable, when the another event notification destination is the information processing apparatus, to send an error event message indicative of the error event to the information processing apparatus.

5. The information processing apparatus according to claim 1, wherein said querying unit is configured to query at a predetermined repetition period regarding whether or not the error has been eliminated in the first terminal apparatus.

6. A communication system comprising:
a plurality of terminal apparatuses,
a plurality of client apparatuses, and
an information processing apparatus,
wherein the plurality of terminal apparatuses, the plurality of client apparatuses, and the information processing apparatus are interconnectable via a network,
the information processing apparatus comprising:
a setting unit configured to set, in a case where a first notification request indicating that a first event message is needed when an event occurs in a first terminal apparatus among the plurality of terminal apparatuses is received from a first client apparatus among the plurality of client apparatuses, the first client apparatus as an event notification destination and the first terminal apparatus as an event registration destination based on the first notification request; and
a first transmitting unit configured to transmit to the set event registration destination, in the case where the first notification request is received, a second notification request indicating that a second event message is needed when an event occurs in the first terminal apparatus, wherein the second notification request includes an indication of an event type to be notified, the first client apparatus comprising:
  a second transmitting unit configured to transmit to the first terminal apparatus, a third notification request indicating that a third event message is needed when an event occurs in the first terminal apparatus, wherein the third notification request includes an indication of an event type to be notified,
the first terminal apparatus comprising:
  a registering unit configured to register, when either the second notification request or the third notification request is received as a received notification request, the received notification request in a storage unit;
  an error determination unit configured to be operable, when an event type of an indicated event having occurred in the first terminal apparatus is an event type included in the received notification request registered in the storage unit, to determine whether or not the indicated event is an error event;
  a notification request-determining unit configured to be operable, when the indicated event is determined to be the error event, to determine whether or not the second notification request has been registered in the storage unit; and
  an event notification unit configured to be operable when the second notification request is determined to have been registered, to send an error event message indicative of the error event to the information processing apparatus as the second event message, and
the information processing apparatus further comprising:
  a reception unit configured to receive the second event message from the first terminal apparatus, in response to the second notification request;
  a transfer unit configured to transfer the second event message received by said reception unit as the first event message to the first client apparatus, in response to the first notification request;
  a querying unit configured to be operable, when the second event message transferred to the client apparatus is related to the error event indicative of the error having occurred in the first terminal apparatus, to query the set event registration destination regarding whether or not the error has been eliminated in the first terminal apparatus; and
  a notification unit configured to send an error recovery message indicative of elimination of the error to the set event notification destination, when a response indicating that the error has been eliminated is received from the first terminal apparatus.

7. A method executed by an information processing apparatus that is interconnectable via a network to a plurality of terminal apparatuses and a plurality of client apparatuses, the method comprising:
  setting, in a case where a first notification request indicating that a first event message is needed when an event occurs in a first terminal apparatus among the plurality of terminal apparatuses is received from a first client apparatus among the plurality of client apparatuses, the first client apparatus as an event notification destination and the first terminal apparatus as an event registration destination based on the first notification request;
  transmitting to the set event registration destination, in the case where the first notification request is received, a second notification request indicating that a second event message is needed when the event occurs in the first terminal apparatus;
  receiving the second event message from the first terminal apparatus, in response to the second notification request;
  transferring the received second event message as the first event message to the first client apparatus, in response to the first notification request;
  querying the set event registration destination regarding whether or not the error has been eliminated in the first terminal apparatus when the second event message transferred to the first client apparatus is related to the error event indicative of the error having occurred in the first terminal apparatus; and
  sending an error recovery message indicative of elimination of the error to the set event notification destination, when a response indicating that the error has been eliminated is received from the first terminal apparatus.

8. A non-transitory computer-readable storage medium storing a computer-executable program for operating an information processing apparatus that is interconnectable via a network to a plurality of terminal apparatuses and a plurality of client apparatuses, the program comprising:
  setting instructions configured to set, in a case where a first notification request indicating that a first event message is needed when an event occurs in a first terminal apparatus among the plurality of terminal apparatuses is received from a first client apparatus among the plurality of client apparatuses, the first client apparatus as an event notification destination and the first terminal apparatus as an event registration destination based on the first notification request;
  transmitting instructions configured to transmit to the set event registration destination, in the case where the first notification request is received, a second notification request indicating that a second event message is needed when the event occurs in the first terminal apparatus;
  reception instructions configured to receive the second event message from the first terminal apparatus, in response to the second notification request;
  transfer instructions configured to transfer the second event message received according to said reception instructions as the first event message to the first client apparatus, in response to the first notification request;
  querying instructions configured to query the set event registration destination regarding whether or not the error has been eliminated in the first terminal apparatus when the second event message transferred to the first client apparatus is related to the error event indicative of the error having occurred in the first terminal apparatus; and
  notification instructions configured to send an error recovery message indicative of elimination of the error to the set event notification destination, when a response indicating that the error has been eliminated is received from the first terminal apparatus.

* * * * *